United States Patent
Robertson et al.

(10) Patent No.: US 7,314,273 B2
(45) Date of Patent: Jan. 1, 2008

(54) PROCESS FOR PREPARING PHTHALOCYANINE COMPOUNDS

(75) Inventors: Colin Dick Robertson, Grangemouth (GB); Jill Louise Johnson, Grangemouth (GB); Prakash Patel, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 145 days.

(21) Appl. No.: 10/507,594

(22) PCT Filed: Feb. 13, 2003

(86) PCT No.: PCT/GB03/00626

§ 371 (c)(1),
(2), (4) Date: Sep. 13, 2004

(87) PCT Pub. No.: WO03/078529

PCT Pub. Date: Sep. 25, 2003

(65) Prior Publication Data

US 2005/0104944 A1    May 19, 2005

(30) Foreign Application Priority Data

Mar. 14, 2002  (GB) ................. 0206015.0

(51) Int. Cl.
C09B 47/26      (2006.01)
(52) U.S. Cl. ............... 347/100; 106/31.13; 106/31.49; 106/31.78
(58) Field of Classification Search ............... 347/100; 106/31.13, 31.49, 31.78
See application file for complete search history.

(56) References Cited

U.S. PATENT DOCUMENTS

| | | | |
|---|---|---|---|
| 3,201,413 A | | 8/1965 | Henrard et al. .......... 260/314.5 |
| 4,280,956 A | * | 7/1981 | Schreiner et al. .......... 540/125 |
| 4,282,000 A | * | 8/1981 | Groll et al. .......... 8/527 |
| 4,874,894 A | * | 10/1989 | Kannan .......... 564/93 |
| 2001/0011396 A1 | * | 8/2001 | Carr .......... 8/445 |
| 2001/0023306 A1 | * | 9/2001 | Kaizik et al. .......... 568/451 |
| 2003/0164114 A1 | * | 9/2003 | Kitayama et al. .......... 106/31.46 |
| 2005/0081748 A1 | * | 4/2005 | Patel .......... 106/31.49 |

FOREIGN PATENT DOCUMENTS

| | | |
|---|---|---|
| DE | 10115893 | 10/2002 |
| EP | 0014407 | 8/1980 |
| EP | 0468649 | 1/1992 |
| EP | 1239010 | 9/2002 |
| EP | 1304359 | 4/2003 |
| GB | 515637 | 12/1939 |
| GB | 1046520 | 10/1996 |
| JP | 62190273 | 8/1987 |
| JP | 07138511 | 5/1995 |
| WO | WO9713811 | 4/1997 |
| WO | WO9967334 | 12/1999 |

\* cited by examiner

Primary Examiner—Manish S. Shah
Assistant Examiner—Laura E. Martin
(74) Attorney, Agent, or Firm—Morgan, Lewis & Bockius LLP

(57) ABSTRACT

A process for preparing a mixture of copper phthalocyanine dyes of Formula (1): $CuPc(SO_3M)_x(SO_2NH_2)_y$, wherein: CuPc is copper phthalocyanine; M is a cation; x and y each independently have a value of from 0.5 to 3.5; and (x+y)=2 to 5; which process includes: chlorosulphonating a copper phthalocyanine compound using a chlorosulphonating agent; and condensing the product of step (i) with ammonia to give a mixture of copper phthalocyanine dyes of Formula (1); optionally exchanging the cation M in the mixture of copper phthalocyanine dyes of Formula (1) resulting from step (ii) for an alternative cation M; wherein the chlorosulphonating agent includes a mixture of chlorosulphonic acid and a chlorinating agent selected from phosphorous oxychloride and phosphorous trichloride. Also the dyes obtainable from this process; compositions and inks including these dyes; materials printed with these dyes, compositions or inks; ink-jet printer cartridges containing inks made from the dyes; and ink-jet printers including these cartridges.

13 Claims, No Drawings

PROCESS FOR PREPARING PHTHALOCYANINE COMPOUNDS

This invention relates to a process for making mixtures of copper phthalocyanine dyes, to the resultant dye mixtures and to their use in ink-jet printing.

Ink-jet printing (IJP) is a non-impact printing technique in which droplets of ink are ejected through a fine nozzle onto a substrate without bringing the nozzle into contact with the substrate. The set of inks used in this technique typically comprise yellow, magenta, cyan and black inks.

With the advent of high-resolution digital cameras and ink-jet printers it is becoming increasingly common to print off photographs using an ink-jet printer. This avoids the expense of conventional silver halide photography and provides a print quickly without the need to post a film to a developing service and wait days or weeks for it to be developed and returned.

While ink-jet printers have many advantages over other forms of printing and image development there are still technical challenges to be addressed. For example, there are the contradictory requirements of providing ink colorants which are soluble in the ink medium and yet do not run or smudge excessively when printed on paper. The inks need to dry quickly to avoid sheets sticking together after they have been printed, but they should not form a crust over the tiny nozzle used in the printer. Storage stability is important to avoid particle formation that could block the tiny nozzles used in the printer. Furthermore, the resultant images desirably do not fade rapidly on exposure to light or common oxidising gases such as ozone.

For a number of years C.I. Direct Blue 199 has been used as a colorant for cyan inks used in ink-jet printing. While this colorant has many properties rendering it suitable for use in ink-jet printing, there is a need for a colorant having superior resistance to fading and shade change when exposed to oxidising gases such as ozone. The problems of fading and shade change on contact with ozone is particularly acute when cyan colorants have been printed onto media containing inorganic particles, e.g. silica and/or aluminina. There appears to be some aspect of the environment on the surface of such media (particularly media used for photorealistic ink-jet printing) which promotes deterioration of this dye in the presence of ozone.

A solution to the above problems is needed which also satisfies the commercial need to manufacturing colorants at affordable prices. In particular, the manufacturing process should not involve too many steps or be wasteful of starting materials or end product. It is also important that the manufacturing process is as convenient as possible and that difficulties such as foaming are avoided wherever possible.

We have now found that use of a particular chlorosulphonating agent to prepare copper phthalocyanine dyes carrying sulphonic acid and sulphonamide ($SO_2NH_2$) groups results in dyes having useful properties for ink-jet printing and, in particular, superior ozone fastness and shade stability compared to the dyes made by other processes. Furthermore these beneficial properties may be achieved in a highly cost effective manner.

According to the present invention there is provided a process for preparing a mixture of copper phthalocyanine dyes of Formula (1):

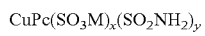   Formula (1)

wherein:
CuPc is copper phthalocyanine;
M is a cation;
x and y each independently have a value of from 0.5 to 3.5; and
(x+y)=2 to 5;

which process comprises:
(i) chlorosulphonating a copper phthalocyanine compound using a chlorosulphonating agent;
(ii) condensing the product of step (i) with ammonia to give a mixture of copper phthalocyanine dyes of Formula (1); and
(iii) optionally exchanging the cation M in the mixture of copper phthalocyanine dyes of Formula (1) resulting from step (ii) for an alternative cation M;

wherein the chlorosulphonating agent comprises a mixture of chlorosulphonic acid and a chlorinating agent selected from phosphorous oxychloride and phosphorous trichloride.

The chlorosulphonation is optionally performed in a sequential manner whereby the copper phthalocyanine compound is first reacted with an excess of chlorosulphonic acid and later a chlorinating agent is added to the mixture of copper phthalocyanine compound and chlorosulphonic acid to form the chlorosulphonating agent in situ. However it is preferred that the chlorosulphonation is performed in one step whereby the copper phthalocyanine compound is in contact with the chlorosulphonating agent comprising both chlorosulphonic acid and chlorinating agent throughout the entire chlorosulphonation step. This one step process is simpler and less prone to errors than operating in a sequential manner.

Preferably the chlorosulphonating agent comprises a mixture of chlorosulphonic acid and phosphorous oxychloride.

The preferred molar ratio of chlorosulphonic acid to chlorinating agent used in the chlorosulphonating agent depends to some extent on the ratio of chlorosulphonic acid to copper phthalocyanine compound. In general, as the ratio of chlorosulphonic acid to copper phthalocyanine compound increases the optimum ratio of chlorosulphonic acid to chlorinating agent in the chlorosulphonating agent also increases (i.e. less chlorinating agent is needed when more chlorosulphonic acid is used. Bearing the above factors in mind, when the molar ratio of chlorosulphonic acid to copper phthalocyanine compound is in the range 10 to 75:1 then the molar ratio of chlorinating agent to copper phthalocyanine compound is preferably in the range 10 to 0.5:1. More preferably, when the molar ratio of chlorosulphonic acid to copper phthalocyanine compound is in the range 15 to 23:1 then the molar ratio of chlorinating agent to copper phthalocyanine compound is preferably in the range 5 to 1:1.

In absolute terms, the molar ratio of chlorosulphonic acid to copper phthalocyanine compound is preferably in the range 5:1 to 200:1, more preferably in the range 10:1 to 75:1 and especially in the range 15:1 to 75:1.

The molar ratio of chlorinating agent to copper phthalocyanine is preferably in the range 0.5:1 to 10:1, more preferably in the range 0.75:1 to 7.5:1 and especially in the range 1:1 to 5:1.

Preferably chlorosulphonation is performed at a temperature in the range of from 90 to 180° C., more preferably 120 to 150° C., especially 130 to 148° C. and more especially 135 to 145° C.

Preferably the chlorosulphonation is performed for 0.5 to 16 hours, more preferably 1 to 8 hours, especially 1.5 to 5.0 hours. In a particularly preferred embodiment chlorosulphonation is performed for 2 to 4 hours.

The length of time for which the chlorosulphonation is performed depends on the temperature used. For example higher temperatures require less time and lower temperatures require more time. In a preferred embodiment chlorosulphonation is performed at a temperature of 135 to 145° C. for a time of 1.5 to 5.0 (more preferably 2 to 4) hours.

The cholorosulphonating agent optionally comprises further ingredients, for example sulphuric acid. When sulphuric acid is present the molar ratio of sulphuric acid to copper phthalocyanine compound is preferably in the range 0.3:1 to 2:1, more preferably 0.6:1 to 1.2:1. Condensation of the product of step (i) with ammonia is preferably performed using ammonia in aqueous solution, e.g. ammonium hydroxide of strength 3 to 35 weight %, preferably 7 to 13 weight %.

The amount of ammonia used in step (ii) will depend to some extent on the composition of and amount of chlorosulphonating agent used in step (i). If a great excess of chlorosulphonating agent was used in step (i) then more ammonia is needed to neutralise excess acid before the process of reacting with —$SO_2Cl$ groups on the phthalocyanine compound can begin. Thus the amount of ammonia used in step (ii) is preferably sufficient to bring the pH of the product of step (i) to a pH of 7 to 11, more preferably a pH of 8 to 10.

Preferably condensation of the product of step (i) with ammonia is performed at a temperature of 0 to 50° C., more preferably 10 to 45° C. and especially 12 to 40° C.

The length of time for which the condensation of the product of step (i) with ammonia is performed depends on the temperature used. For example higher temperatures require less time and lower temperatures require more time. In a preferred embodiment condensation of the product of step (i) with ammonia is performed at a temperature of 0 to 45° C. for a time of 0.5 to 24 hours.

Preferably (x+y) has a value of 3 to 4.5, more preferably 3.5 to 4.4.

Preferably x has a value of 0.1 to 3, more preferably 0.2 to 2.2.

Preferably y has a value of 1 to 4, more preferably 1.8 to 3.5.

Preferably y has a value greater than or equal to x, more preferably y has a value greater than x.

Preferably the values of x and y are such that when the compound of Formula (1) has a solubility in water at 20° C. and pH 9 less than 25 weight %, more preferably less than 20 weight % as measured using a 0.2 micron filter. The solubility may be measured using the method described in Example 13.

The cation represented by M is preferably an alkali metal salt, especially lithium, sodium and potassium, ammonium or a substituted ammonium salt (including a quaternary ammonium salt such as $((CH_3)_4N^+)$ or a mixture thereof. Especially preferred are salts with sodium, lithium, ammonia and volatile amines, more especially sodium salts.

By following steps (i) and (ii) of the process according to the present invention a mixture of copper phthalocyanine dyes of Formula (1) will usually result where M is largely ammonium cations. However, if desired the product of step (ii) may be converted from the salt form arising from step (ii) to the free acid form or an alternative salt form. Thus the process optionally comprises step (iii) in which the cation M resulting from step (ii) is exchanged for an alternative cation.

Any of the known techniques for exchanging one cation for another may be used to exchange cation M resulting from step (ii) for an alternative cation M. For example, the product of step (ii) may be acidified (e.g. using hydrochloric acid to give M=H), optionally followed by dialysis, to remove the original cations with subsequent addition of alternative cations M (e.g. by addition of alkali metal hydroxide, ammonium salt or amine). Use of ion exchange resins and reverse osmosis are amongst the other well-known techniques for exchanging one cation for another.

Preferably the mixture of copper phthalocyanine dyes obtained by the process is such that when the mixture has been printed onto microporous paper (e.g. Epson Premium Photopaper and Canon PR101 Photopaper) it loses less than 20% of its optical density, more preferably less than 15% of its optical density, especially less than 10% of its optical density, more especially less than 7% of its optical density and particularly less than 5% of its optical density when exposed to 1 part per million of ozone for 24 hours at 40° C. and 50% humidity.

Taking account of the preferences described above, a particularly preferred embodiment of the process is where:
x has a value of 0.2 to 2.2;
y has a value of 1.8 to 3.5;
y has a value greater than or equal to x; and
(x+y)=3.5 to 4.4;

and the process comprises:
(i) chlorosulphonating a copper phthalocyanine compound at a temperature of 135 to 145° C. for a period of 1.5 to 5.0 hours using a chlorosulphonating agent; and
(ii) condensing the product of step (i) at a temperature in the range 10 to 45° C. for 0.5 to 24 hours with ammonia in the form of ammonium hydroxide at a pH in the range 8 to 10 to give a mixture of copper phthalocyanine dyes of Formula (1);
(iii) optionally exchanging the cation M in the mixture of copper phthalocyanine dyes of Formula (1) resulting from step (ii) for an alternative cation M; and wherein the chlorosulphonating agent comprises a mixture of chlorosulphonic acid and a chlorinating agent selected from phosphorous oxychloride and phosphorous trichloride, preferably phosphorous oxychloride, such that the molar ratio of chlorosulphonic acid to copper phthalocyanine compound is in the range 15 to 23:1 and the molar ratio of said chlorinating agent to copper phthalocyanine compound is in the range 5 to 1:1.

Preferably the process of the present invention is free from steps in which the absorbance of the phthalocyanine compound of Formula (1) between 640 and 670 nm is lowered relative to the absorbance at 590 to 630 nm by removal of phthalocyanine compounds having an absorbance peak between 640 and 670 nm. For example, the process is preferably free from precipitation (e.g. salting-out) and filtration steps which remove phthalocyanine compounds having an absorbance peak between 640 and 670 nm more efficiently than phthalocyanine compounds lacking an absorbance between 640 and 670 nm. The reason for this preference is that removal of the phthalocyanine compounds having an absorbance peak between 640 and 670 nm is wasteful since it is an extra process step and the removed compounds are thrown away. The process of the present invention may be performed such that there is no need to remove such phthalocyanine compounds because they do not arise or they arise only to a much lower extent than when chlorosulphonic acid is used without the specified chlorinating agents being present.

A second aspect of the invention provides a mixture of copper phthalocyanine dyes of Formula (1) as hereinbefore defined obtainable by a process according to the first aspect of the invention.

Mixtures of copper phthalocyanine dyes according to the second aspect of the invention have attractive, strong cyan shades and are valuable colorants for use in the preparation of ink-jet printing inks. They benefit from a good balance of solubility, storage stability and fastness to water and light. In particular, compared to known preparations of Direct Blue 199, they display excellent light and ozone fastness. Furthermore they may be prepared using existing production facilities from cheap intermediates thus avoiding the complexity and expense associated with the manufacture of more elaborate phthalocyanine dye structures.

According to a third aspect of the present invention there is provided a composition comprising a mixture of copper phthalocyanine dyes according to the second aspect of the invention and a liquid medium.

Preferred compositions comprise:
(a) from 0.01 to 10 parts of a mixture of copper phthalocyanine dyes according to the second aspect of the invention; and
(b) from 90 to 99.99 parts of a liquid medium;

wherein all parts are by weight and the number of parts of (a)+(b)=100.

Preferred liquid media include water, a mixture of water and organic solvent and organic solvent free from water.

When the medium comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono- $C_{1-4}$-alkyl and $C_{1-4}$-alkyl ethers of diols, more preferably mono-$C_{1-4}$alkyl ethers of diols having 2 to 12 carbon atoms, especially 2-methoxy-2-ethoxy-2-ethoxyethanol. When the liquid medium comprises a mixture of water and organic solvent or an organic solvent free from water component (a) is preferably completely dissolved in component (b). The liquid media may of course contain additional components conventionally used in ink-jet printing inks, for example viscosity and surface tension modifiers, corrosion inhibitors, biocides, kogation reducing additives and surfactants which may be ionic or non-ionic.

Although not usually necessary, further colorants may be added to the ink to modify the shade and performance properties. Examples of such colorants include C.I. Direct Yellow 86, 132, 142 and 173; C.I. Direct Blue 307; C.I. Food Black 2; C.I. Direct Black 168 and 195; C.I. Acid Yellow 23; and any of the dyes used in ink-jet printers sold by Seiko Epson Corporation, Hewlett Packard Company, Canon Inc. & Lexmark International.

It is preferred that the composition according to the second aspect of the invention is an ink suitable for use in an ink-jet printer.

The inks may be incorporated in an ink-jet printer as a high concentration cyan ink, a low concentration cyan ink or both a high concentration and a low concentration ink. In the latter case this can lead to improvements in the resolution and quality of printed images. Thus the present invention also provides a composition according to the third aspect of the present invention (preferably an ink) where component (a) is present in an amount of 2.5 to 7 parts, more preferably 2.5 to 5 parts (a high concentration ink) or component (a) is present in an amount of 0.5 to 2.4 parts, more preferably 0.5 to 1.5 parts (a low concentration ink).

Thus, preferably the ink has a viscosity of less than 20 cP, more preferably less than 10 cP, especially less than 5 cP, at 25° C. These low viscosity inks are particularly well suited for application to substrates by means of ink-jet printers.

Preferably the ink contains less than 500 ppm, more preferably less than 250 ppm, especially less than 100 ppm, more especially less than 10 ppm in total of divalent and trivalent metal ions (other than any divalent and trivalent metal ions bound to a component of the ink).

Preferably the ink has been filtered through a filter having a mean pore size below 10 µm, more preferably below 3 µm, especially below 2 µm, more especially below 1 µm. This filtration removes particulate matter that could otherwise block the fine nozzles found in many ink-jet printers.

Preferably the ink contains less than 500 ppm, more preferably less than 250 ppm, especially less than 100 ppm, more especially less than 10 ppm in total of halide ions.

A fourth aspect of the invention provides a process for forming an image on a substrate comprising applying an ink according to the third aspect of the invention thereto by means of an ink-jet printer.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternately the ink can be ejected by an electro-mechanical actuator connected to a moveable paddle or plunger, for example as described in International Patent Application WO00/48938 and International Patent Application WO00/55089.

The substrate is preferably paper, plastic, a textile, metal or glass, more preferably paper, an overhead projector slide or a textile material, especially paper.

Preferred papers are plain or treated papers which may have an acid, alkaline or neutral character. Glossy papers are especially preferred.

A fifth aspect of the present invention provides a material preferably paper, plastic, a textile, metal or glass, more preferably paper, an overhead projector slide or a textile material, especially paper more especially plain, coated or treated papers printed with a composition according to the third aspect of the invention, a mixture of copper phthalocyanine dyes according to the second aspect of the invention or by means of a process according to fourth aspect of the invention.

A sixth aspect of the present invention provides an ink-jet printer cartridge comprising a chamber and an ink wherein the ink is in the chamber and the ink is as defined in the third aspect of the present invention. Preferably the cartridge contains a high concentration ink and a low concentration ink as described above in different chambers.

A seventh aspect of the present invention provides an ink-jet printer comprising a cartridge as defined in the sixth aspect of the present invention The invention is further illustrated by the following Examples in which all parts and percentages are by weight unless otherwise stated.

EXAMPLE 1

Step (i)—Chlorosulphonating a Copper Phthalocyanine Compound using a Chlorosulphonating Agent Comprising a Mixture of Chlorosulphonic Acid and $POCl_3$.

Phosphorus oxychloride (4.7 ml, 7.7 g, 0.05 mole) was added to chlorosulphonic acid (61.6 ml, 109.0 g, 0.93 mole). Copper phthalocyanine (23.5 g, 0.04 mole) was then added in small portions while maintaining the temperature below 60° C. When the addition of copper phthalocyanine was complete the reaction mixture was heated to 140° C. over the course of about 30 minutes. The reaction mixture was maintained at 140° C. for 3 hr and then cooled to ambient temperature and stirred for 30 minutes. The reaction mixture was then added to a mixture of ice/water (800 g) and salt (20 g) at $\leq 0°$ C. More ice was added to maintain the temperature below 0° C. The resultant copper phthalocyanine sulphonyl chloride product was filtered-off and washed with ice cold 5% brine (250 ml). The resultant copper phthalocyanine sulphonyl chloride paste was then added to an ice/water mixture (300 g) and stirred until dispersed.

Step (ii)—Condensing the Product of Step (i) with Ammonia to give a Mixture of Copper Phthalocyanine Dyes of Formula (1).

The pH of the dispersion resulting from step (i) was then raised to pH 9.5 using 10% ammonia solution. The temperature of the mixture was then allowed to rise slowly to room temperature while maintaining the pH at 9.5±0.1 using 10% ammonia solution. The reaction mixture was then stirred overnight at pH 9.5 and room temperature. Next morning the mixture was stirred rapidly while the pH was adjusted to pH 6.5 using concentrated hydrochloric acid. Saturated brine (100 ml) was added and the pH was reduced to pH 3.5 using concentrated hydrochloric acid. The product was collected by filtration and the resultant paste was stirred in water (1000 ml) and rendered soluble by adjusting the pH to 9.5 by the addition of 2M NaOH. The solution so formed was dialysed to remove inorganic salts then screened through GF/F paper. The filtrate was dried in an oven at 50° C. overnight to yield a mixture of copper phthalocyanine dyes of Formula (1) wherein M is sodium, x is 1.2 and y is 2.7 (34.3 g).

EXAMPLES 2 TO 11

The method of Example 1 was repeated except that the relative molar amounts of copper phthalocyanine ("CuPc"), chlorosulphonic acid ("CSA"), $H_2SO_4$ and chlorinating agent ($POCl_3$) were as shown in Table 1 below. The 6$^{th}$ and 7$^{th}$ columns in Table 1 show respectively the length of time and temperature at which the chlorosulphonation was performed. The final two columns in Table 1 show the values of x and y in the resultant mixture of copper phthalocyanine dyes of Formula (1).

TABLE 1

|  | CuPc | CSA | $H_2SO_4$ | $POCl_3$ | Time (hours) | Temperature (° C.) | x | y |
| --- | --- | --- | --- | --- | --- | --- | --- | --- |
| Example 2 | 1 | 50 | 0 | 3.8 | 4 | 140 | 0.1 | 4.0 |
| Example 3 | 1 | 23 | 0 | 1.5 | 4 | 140 | — | — |
| Example 4 | 1 | 23 | 0 | 1 | 4 | 140 | 1.3 | 2.7 |
| Example 5 | 1 | 23 | 0 | 1.35 | 3 | 140 | 1.8 | 1.8 |
| Example 6 | 1 | 23 | 0 | 1.25 | 3 | 140 | 1.6 | 2.1 |
| Example 7 | 1 | 23 | 0.9 | 1.35 | 3 | 140 | — | — |
| Example 8 | 1 | 23 | 0 | 0.88 | 3 | 140 | 1.6 | 2.5 |
| Example 9 | 1 | 23 | 0 | 2.1 | 4 | 140 | — | — |
| Example 10 | 1 | 23 | 0 | 1 | 3 | 120 | — | — |
| Example 11 | 1 | 23 | 0 | 0.5 | 3 | 120 | — | — |

— means not measured.

COMPARATIVE EXAMPLE

The comparative mixture of copper phthalocyanine dyes was C.I. Direct Blue 199 obtained as Pro-Jet ™Cyan 1 from Avecia Limited.

EXAMPLE 12

Preparation of Inks

Inks 1 to 11 and Comparative Ink 1 were prepared by dissolving 0.7 g of dye mixture from the above Examples 1 to 11 and Pro-Jet ™Cyan 1 respectively in 19.3 g of a liquid medium comprising:

| | |
|---|---|
| Thiodiglycol | 5% |
| Urea | 2.5% |
| 2-Pyrollidone | 2.5% |
| Surfynol ™ 465 | 1% |
| Water | 89% (all % by weight) | and adjusting the pH of the ink to pH 8-10 using sodium hydroxide. Surfynol™ 465 is a surfactant from Air Products Ltd.

EXAMPLE 13

Ink-Jet Printing and Results

Solubility Measurements

Solubility of the dye mixtures resulting from Examples 1 to 11 were measured as follows:

A saturated slurry of the dye mixture under investigation, in water, was placed in a freeze thaw (−15 to +25° C.) cabinet for 3 days and then allowed to reach room temperature over 2 hours. The pH was adjusted to 9. A portion was then filtered through a 0.2 micron syringe filter. A few drops of the filtrate (which represents a solution of the dye mixture having the maximum concentration of dye achievable) were accurately weighed and its absorbance at a given wavelength was measured. This absorbance measurement was compared to a previously constructed calibration curve showing absorbance versus concentration and the concentration of dye mixture at read from the curve. This concentration was the solubility of the dye at pH 9.

This experiment was then repeated filtering through a 0.02 micron syringe filter.

The solubility results are shown in Table 2 below.

Ink-Jet Printing

Inks 1 to 11 and Comparative Ink 1, described in Example 12, were filtered through 0.45 micron nylon filters and then incorporated into empty EPSON 880 print cartridges using a syringe.

The inks were then printed using an EPSON 880 Printer, using the Adobe Half Test print program, onto EPSON Premium Photopaper ("SEC PM") and Canon PR101 Photopaper ("PR101"). The resultant prints at 100% were then tested for ozone fastness by exposure to 1 ppm ozone at 40° C., 50% relative humidity for 24 hrs in a Hampden 903 Ozone cabinet.

The Delta E and % OD loss were measured.

Results

TABLE 2

| | % Solubility 0.2 micron filter | % Solubility 0.02 micron filter | Delta E PR101 | % OD Loss PR101 | Delta E SEC PM | % OD Loss SEC PM |
|---|---|---|---|---|---|---|
| Ink 1 | 18 | 9.3 | 14 | 0 | 10 | 0 |
| Ink 2 | 7.7 | 4.8 | 1 | −1 | 1 | 3 |
| Ink 3 | 14.7 | — | 20 | 0 | 14 | 2 |
| Ink 4 | 22.9 | 15.7 | 35 | 13 | 19 | 16 |
| Ink 5 | 19.9 | — | 37 | 12 | 23 | 18 |
| Ink 6 | 22.7 | 14.6 | 16 | 2 | 14 | 0 |
| Ink 7 | 19.7 | 19.68 | — | — | — | — |
| Ink 8 | 19.7 | 12.1 | 33 | 13 | 21 | 16 |
| Ink 9 | 13.8 | — | — | — | — | — |
| Comparative Ink 1 | 35.75 | 33.93 | 52 | 43 | 27 | 24 |

— means not measured.
Table 2 shows that the dye mixtures of the present invention have a lower OD loss in ozone (i.e. higher ozone fastness) and a lower Delta E in ozone (i.e. lower shade change) than conventional C.I Direct Blue 199.

EXAMPLE 14

Further Inks

The inks described in Tables I to II may be prepared using the mixture of copper phthalocyanine dyes made in Example 1. Numbers quoted in the second column onwards refer to the number of parts of the relevant ingredient and all parts are by weight. The inks may be applied to paper by thermal or piezo ink-jet printing.

The following abbreviations are used in Table I and II:

PG=propylene glycol
DEG=diethylene glycol
NMP=N-methyl pyrollidone
DMK=dimethylketone
IPA=isopropanol
MEOH=methanol
2P=2-pyrollidone
MIBK=methylisobutyl ketone
P12=propane-1,2-diol
BDL=butane-2,3-diol
CET=cetyl ammonium bromide
PHO=$Na_2HPO_4$ and
TBT=tertiary butanol
TDG=thiodiglycol

TABLE I

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 |   | 6 | 4 |   |   |   |   | 5 |   |
| 2 | 3.0 | 90 |   | 5 | 5 |   | 0.2 |   |   |   |   |   |
| 3 | 1 | 85 | 3 |   | 3 | 3 |   |   |   | 5 | 1 |   |
| 4 | 2.1 | 91 |   | 8 |   |   |   |   |   |   |   | 1 |
| 5 | 3.1 | 86 | 5 |   |   |   |   | 0.2 | 4 |   |   | 5 |
| 6 | 1.1 | 81 |   |   | 9 |   | 0.5 | 0.5 |   |   | 9 |   |
| 7 | 2.5 | 60 | 4 | 15 | 3 | 3 |   |   | 6 | 10 | 5 | 4 |
| 8 | 5 | 65 |   | 20 |   |   |   |   | 10 |   |   |   |
| 9 | 2.4 | 75 | 5 | 4 |   | 5 |   |   |   | 6 |   | 5 |
| 10 | 4.1 | 80 | 3 | 5 | 2 | 10 |   | 0.3 |   |   |   |   |
| 11 | 3.2 | 65 |   | 5 | 4 | 6 |   |   | 5 | 4 | 6 | 5 |
| 5 | 5.1 | 96 |   |   |   |   |   |   |   | 4 |   |   |
| 1 | 1.8 | 90 | 5 |   |   |   |   |   | 5 |   |   |   |
| 2 | 1 | 80 | 2 |   | 6 | 2 | 5 |   | 1 |   | 4 |   |
| 3 | 1.8 | 80 |   | 5 |   |   |   |   |   |   | 15 |   |
| 4 | 2.6 | 84 |   |   | 11 |   |   |   |   |   | 5 |   |
| 5 | 3.3 | 80 | 2 |   |   | 10 |   |   |   | 2 |   | 6 |
| 6 | 7 | 90 |   |   | 7 |   | 0.3 |   | 3 |   |   |   |
| 7 | 5.4 | 69 | 2 | 20 | 2 | 1 |   |   |   |   | 3 | 3 |
| 8 | 6.0 | 91 |   |   | 4 |   |   |   |   |   | 5 |   |

TABLE II

| Dye | Dye Content | Water | PG | DEG | NMP | CET | TBT | TDG | BDL | PHO | 2P | PI2 |
|---|---|---|---|---|---|---|---|---|---|---|---|---|
| 9 | 3.0 | 80 | 15 |   |   | 0.2 |   |   |   |   | 5 |   |
| 10 | 4 | 90 |   | 5 |   |   |   |   |   | 1.2 |   | 5 |
| 11 | 1.5 | 85 | 5 | 5 |   | 0.15 | 5.0 | 0.2 |   |   |   |   |
| 1 | 2.5 | 90 |   |   | 6 | 4 |   |   |   | 0.12 |   |   |
| 2 | 3.1 | 82 | 4 | 8 |   | 0.3 |   |   |   |   |   | 6 |
| 3 | 0.9 | 85 |   |   | 10 |   |   |   | 5 | 0.2 |   |   |
| 4 | 4 | 90 |   |   | 5 |   |   | 0.3 |   |   |   |   |
| 5 | 4.0 | 70 |   |   | 10 | 4 |   |   | 1 |   | 4 | 11 |
| 6 | 2.2 | 75 | 4 |   | 10 | 3 |   |   | 2 |   | 6 |   |
| 10 | 4 | 91 |   |   |   | 6 |   |   |   |   | 3 |   |
| 7 | 3 | 76 |   | 9 | 7 |   | 3.0 |   |   | 0.95 | 5 |   |
| 8 | 5.0 | 78 | 5 | 11 |   |   |   |   |   |   | 6 |   |
| 9 | 5.4 | 86 |   |   | 7 |   |   |   |   |   | 7 |   |
| 10 | 2.1 | 70 | 5 | 5 | 5 | 0.1 | 0.2 | 0.1 | 5 | 0.1 | 5 |   |
| 11 | 2.0 | 90 |   | 10 |   |   |   |   |   |   |   |   |
| 1 | 2 | 88 |   |   |   |   |   | 10 |   |   |   |   |
| 2 | 5 | 78 |   |   | 5 |   |   | 12 |   |   | 5 |   |
| 1 | 7 | 70 | 2 |   | 8 |   |   | 15 |   |   | 5 |   |
| 1 | 2.2 | 80 |   |   |   |   |   | 8 |   |   | 12 |   |
| 1 | 1.4 | 80 |   |   | 10 |   |   |   |   |   |   |   |

The invention claimed is:

1. In a process for preparing a mixture of copper phthalocyanine dyes of Formula (1):

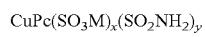

$$\text{CuPc(SO}_3\text{M)}_x\text{(SO}_2\text{NH}_2\text{)}_y \qquad \text{Formula (1)}$$

wherein:

CuPc is copper phthalocyanine;

M is a cation;

x and y each independently have a value of from 0.5 to 3.5; and (x+y)=2 to 5;

which process comprises:
  (i) chlorosulphonating a copper phthalocyanine compound using a chlorosulphonating agent; and
  (ii) condensing the product of step (i) with ammonia to give a mixture of copper phthalocyanine dyes of Formula (1);
  (iii) optionally exchanging the cation M in the mixture of copper phthalocyanine dyes of Formula (1) resulting from step (ii) for an alternative cation M;

the improvement wherein the chlorosulphonating agent used in (i) comprises a mixture of chlorosulphonic acid and phosphorous oxychloride the molar ratio of chlorosulphonic acid to copper phthalocyanine compound in (i) being in the range 10 to 75:1 and the molar ratio of phosphorous oxychloride to copper phthalocyanine compound being in the range 10 to 0.5:1.

2. A process according to claim 1 wherein the chlorosulphonation is performed in one step whereby said copper phthalocyanine compound is in contact with said chlorosulphonating agent comprising both chlorosulphonic acid and phosphorous oxychloride throughout the entire chlorosulphonation step.

3. A process according to claim 1 wherein y has a value greater than or equal to x.

4. A process according to claim 1 wherein:

x has a value of 0.2 to 2.2;

y has a value of 1.8 to 3.5;

y has a value greater than or equal to x; and (x+y)=3.5 to 4.4;

and the process comprises:
  (i) chlorosulphonating a copper phthalocyanine compound at a temperature of 135 to 145° C. for a period of 2.5 to 5.5 hours using a chlorosulphonating agent; and
  (ii) condensing the product of step (i) at a temperature in the range 10 to 45° C. for 0.5 to 24 hours with ammonia in the form of ammonium hydroxide at a pH in the range 8 to 10 to give a mixture of copper phthalocyanine dyes of Formula (1);
  (iii) optionally exchanging the cation M in the mixture of copper phthalocyanine dyes of Formula (1) resulting from step (ii) for an alternative cation M; and
wherein the chlorosulphonating agent comprises a mixture of chlorosulphonic acid and phosphorous oxychloride such that the molar ratio of chlorosulphonic acid to copper phthalocyanine compound is in the range 15 to 23:1 and the molars ratio of said phosphorus oxychloride to copper phthalocyanine compound is in the range 5 to 1:1.

5. The mixture of copper phthalocyanine dyes obtained by the process according to claim 1.

6. A composition comprising a mixture of copper phthalocyanine dyes according to claim 5 and a liquid medium.

7. A composition according to claim 6 wherein the liquid medium comprises a mixture of water and organic solvent.

8. A composition according to claim 6 which is an ink suitable for use in an ink-jet printer.

9. A process for forming an image on a substrate comprising applying thereto an ink according to claim 8 by means of an ink-jet printer.

10. A paper, plastic, a textile, metal or glass, printed with a composition according to any one of claims 6 to 8.

11. An ink-jet printer cartridge comprising a chamber and an ink wherein the ink is in the chamber and the ink is as defined in claim 8.

12. An ink-jet printer cartridge comprising a chamber and an ink wherein the ink is in the chamber and wherein said cartridge contains a high concentration ink and a low concentration ink according to claim 8.

13. An ink-jet printer comprising a cartridge as defined in claim 11 or 12.

* * * * *